Oct. 18, 1949.　　　　B. R. PURVIN　　　　2,484,856
AUTOMATIC HOB SLIDE
Filed March 23, 1944　　　　　　　　　　　　6 Sheets-Sheet 1

Fig. 1.

INVENTOR
Benjamin R. Purvin
BY
Carlson, ... & Wolfe
ATTORNEYS

Oct. 18, 1949.  B. R. PURVIN  2,484,856
AUTOMATIC HOB SLIDE
Filed March 23, 1944  6 Sheets-Sheet 2

INVENTOR
Benjamin R. Purvin
BY
Carlson, Pitzner, Hubbard & Wolfe
ATTORNEYS

Oct. 18, 1949.  B. R. PURVIN  2,484,856
AUTOMATIC HOB SLIDE
Filed March 23, 1944  6 Sheets-Sheet 4

INVENTOR
Benjamin R. Purvin
BY
Carlson, Pitzner, Hollard & Wolfe
ATTORNEYS

Oct. 18, 1949.　　　　　B. R. PURVIN　　　　　2,484,856
AUTOMATIC HOB SLIDE
Filed March 23, 1944　　　　　　　　　　　　6 Sheets-Sheet 5

INVENTOR
Benjamin R. Purvin
BY
Carlson, Pitzner, Hubbard & Wolfe
ATTORNEYS

Oct. 18, 1949.    B. R. PURVIN    2,484,856
AUTOMATIC HOB SLIDE
Filed March 23, 1944    6 Sheets-Sheet 6

INVENTOR
Benjamin R. Purvin
BY
Carlson, Pitzner, Holland & Wolfe
ATTORNEYS

Patented Oct. 18, 1949

2,484,856

UNITED STATES PATENT OFFICE 2,484,856

AUTOMATIC HOB SLIDE

Benjamin R. Purvin, Detroit, Mich., assignor to Barber-Colman Company, Rockford, Ill., a corporation of Illinois Application March 23, 1944, Serial No. 527,686

24 Claims. (Cl. 90—4)

The invention relates generally to improvements in hobbing machines for cutting gears, multiple spline shafts and other similar toothed elements, and particularly to a movable support for the tool or work, such as a hob slide, which is automatically adjustable at a predetermined point in the machine cycle to effect an incremental axial shift of the hob relative to the work, whereby different portions of the hob are brought into cutting position in successive machine cycles.

One of the objects of the present invention is to provide a novel shiftable support of the foregoing character in which the extent of the axial shift of the hob relative to the work in each machine cycle is subject to selective variation.

Another object is to provide a new and improved automatic hob slide which is incrementally adjustable through one or a selected number of additive steps in each cycle of operations to shift the hob spindle axially a predetermined but variable distance.

A further object is to provide a new and improved automatic hob slide in which the hob spindle is shifted axially step-by-step in successive machine cycles, and in which the step-by-step movement is automatically reversed at each end of the range of shifting movement, so that the hob is caused to travel back and forth through substantially its effective cutting length, and wear thereon is uniformly distributed.

Another object is to provide a novel hob slide which is automatically shiftable periodically to adjust the axial position of the hob in the course of each machine cycle, and which is automatically released and clamped respectively before and after each adjustment.

Further objects and advantages will become apparent as the description proceeds.

In the accompanying drawings.

Referring more particularly to the drawings, the automatic hob slide constituting the exemplary embodiment of the invention is adapted for use in various types of hobbing machines. For purposes of illustration, the slide is shown as forming part of an automatic hobbing machine of the type disclosed in my Patent No. 2,338,737.

The exemplary machine comprises a base 13 supporting a right-hand column 14 and a left-hand column 15 on opposite ends. Extending across the top of the columns and secured thereto is a bridge 16. The base, the columns and the bridge define a central space or opening 17 in which the operative elements of the machine are disposed, and form a rigid supporting structure that is capable of withstanding, without yielding, the heavy stresses imposed during a cutting operation, such as hobbing.

Mounted for vertical reciprocation on the inner side of the right-hand column 14 is a slide 18 having a vertical work spindle 19 for supporting a work blank W for rotation and axial translation in a program of feed and rapid traverse movements. The drive means for the slide 18 and spindle 19 is not fully disclosed herein, since per se it forms no part of the present invention, but reference may be had to said patent for a more complete understanding thereof.

A tool support 20 for a cutting tool or hob H is mounted within the left-hand column 15 in opposed relation to the slide 18 and is reciprocable transversely of the axis of the spindle 19, alternately to advance the hob into cutting position relative to the work W before commencement of the cut, and to retract the hob into an inoperative position remote from the work at the end of the cut. More particularly, the left-hand column 15 has an enlarged recess or opening 21 therein located substantially midway between the base 13 and the bridge 16. Horizontally disposed ways 22, extending inwardly of the opening 21, support a ram or swivel slide 23. A slide swivel 24 is mounted for angular adjustment against the outer end of the slide 23, and is adapted to be secured in position by means of clamp bolts 25. The outer face of the swivel 24 is formed with a diametrically extending dovetail guideway 26 for adjustably supporting a spindle slide 27. The hob H is fixed on a tool spindle 28 journaled in spaced bearings 29 on the slide 27 with its axis extending longitudinally thereof. Suitable means is provided for driving the hob spindle 28 in timed relation to the work spindle 19, and this means comprises a gear 30 fixed on one end of the spindle. The gear 30 meshes with a gear 31 on a shaft 32 adapted to be driven from a source of power in all positions of angular adjustment of the swivel 24, as more fully disclosed in the aforesaid patent.

Movement of the slide 23 between its retracted and extended positions is preferably effected by hydraulically actuated means. Thus, one side wall of the slide is formed with a cylinder 33 paralleling the direction of slide movement. A piston 34 in the cylinder has a rod 35 extending beyond the rear face of the slide and rigidly secured, as indicated at 36, to the left-hand column 15.

Figure 1:
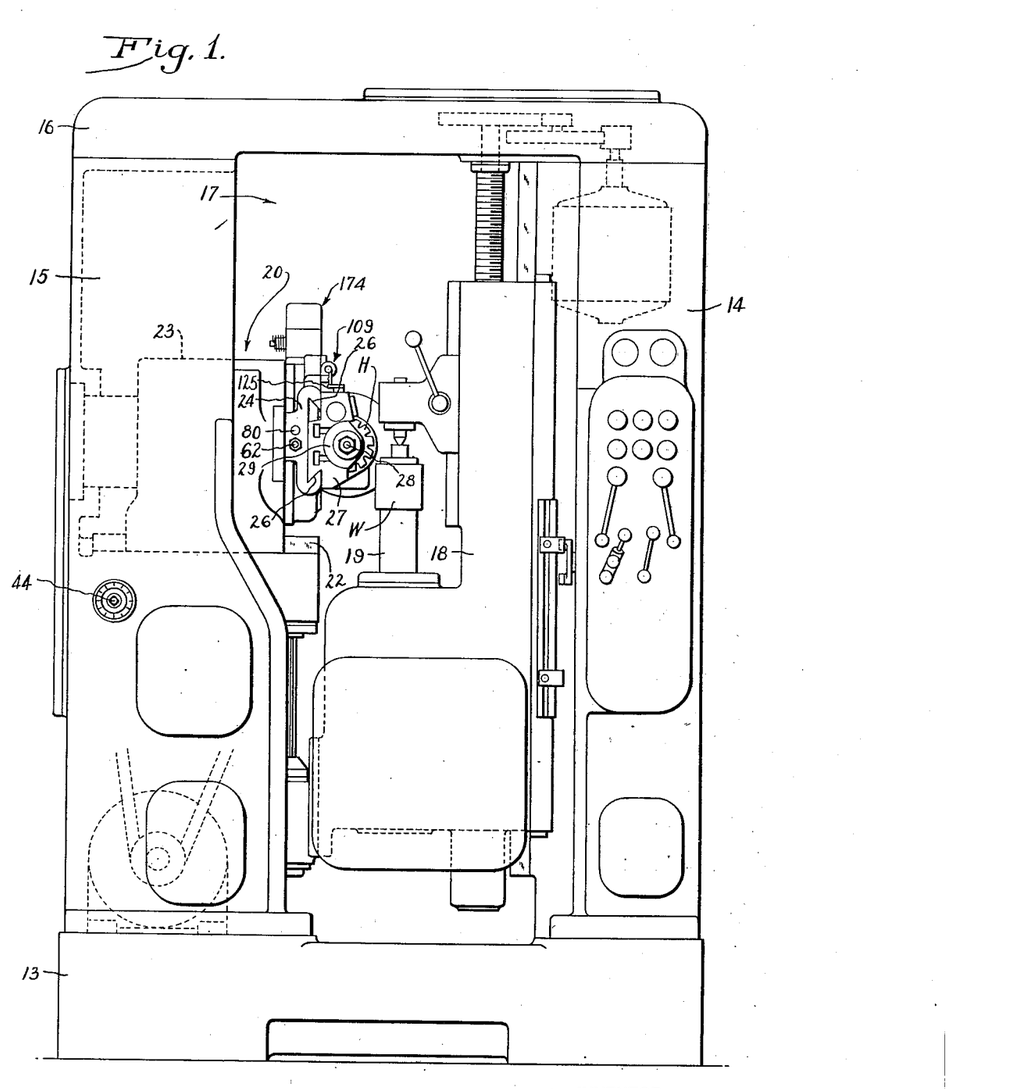
Figure 1 is a front elevational view of a hobbing machine having an automatic hob spindle slide embodying the features of my invention.
Figures 2, 3, 4:
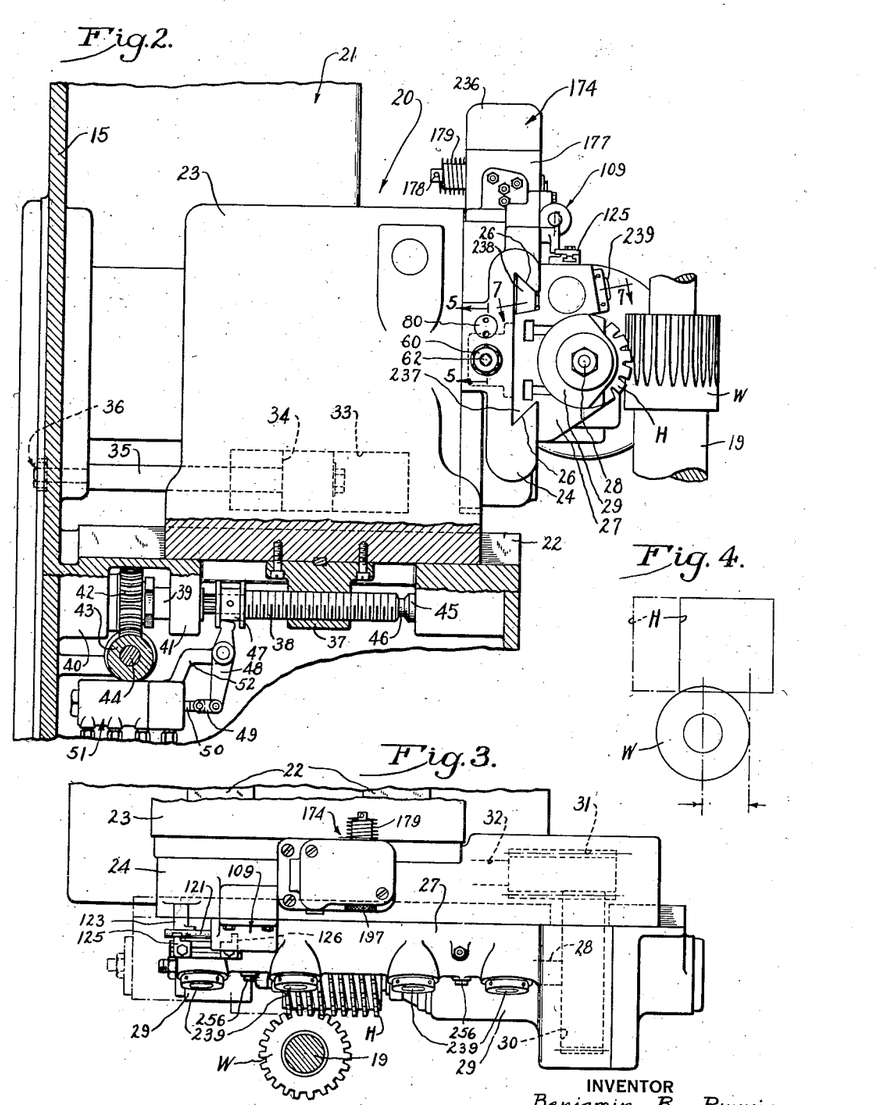
Fig. 2 is a fragmentary vertical sectional view of a portion of the machine, and illustrating the hob spindle slide and a supporting swivel slide in side elevation.
Fig. 3 is a fragmentary plan view of the automatic hob spindle slide.
Fig. 4 is a diagrammatic representation of the hob in cutting relation to the work, and illustrating the range of axial adjustment of the hob to locate successive increments of its effective length in cutting position.

Means is provided for adjustably determining the extended or advanced position of the swivel slide 23 and its associated parts. Referring to Fig. 2, the slide has affixed thereto a depending nut 37 for engagement by a screw 38 disposed in parallelism with the slide ways 22. A tubular shaft 39, rotatably supported in bearing lugs 40 and 41 on the left-hand column 15, is axially alined with one end of the screw 38. A worm gear 42 is keyed to the shaft 39, and meshes with a worm 43 on an operating shaft 44. The outer end of the shaft 44 extends through the column 15 (see Fig. 1) for manipulation by the operator to effect rotation of the screw 38.

The limits of slide movement are determined by suitable stops. Thus, the advanced or extended position of the slide 23 is limited by a stop pin 45 mounted on the column for engagement by a head 46 on the free end of the screw 38. The retracted position of the slide 23 is determined by the abutment of a shifting collar 47, fixed on the screw 38, with the inner end of the tubular shaft 39. By rotating the screw 38, and thereby adjusting the position of the slide 23 in relation to the stops 45 and 47, the extended or operative position of the slide is adjusted and predetermined, and incidentally the retracted position is correspondingly adjusted.

As will presently be more particularly described, the advancing and retracting movements of the swivel slide are used to establish certain relationships in the control system. The shifting collar 47 is, therefore, arranged to swing a lever 48 which is connected through a link 49 with the stem 50 of a pilot valve 51. The lever may be pivotally supported by an arm 52 on the valve casing. The shifting collar 47 and the lever 48 have a lost motion connection such that the valve will be alternately disposed in its two operative positions as the swivel slide completes its movement respectively into the advanced and retracted positions.

In the normal cycle of the machine, the swivel slide 23 is advanced to locate the hob H in position for cutting engagement with the work W. Assuming that a spur gear is to be cut, the swivel 24 is adjusted to position the hob spindle 28 at an angle to the horizontal in accordance with the lead angle of the hob thread. With the hob H and workpiece W rotating in timed relation, the slide 18 now is elevated first in a rapid approach and then at a feed rate to move the workpiece axially through cutting engagement with the hob. After the workpiece W has passed through the cutting zone, the slide 23 is returned to its retracted position so as to withdraw the hob H out of the path of the workpiece, and thereupon the work slide 18 is returned downwardly at a rapid traverse rate into initial position.

During cutting engagement, the hob H and the workpiece W occupy the relative position shown in Figs. 2, 3 and 4. In any one cycle, only a portion of the effective length of the hob H is in cutting engagement with the workpiece W. By shifting the hob axially through a predetermined distance after each cycle, the entire effective cutting length of the hob is brought into use, and consequently hob wear is uniformly distributed and hob life is substantially prolonged. The present invention relates primarily to means for effecting automatic axial adjustment of the hob H in a step-by-step shifting movement back and forth through a range substantially equal to its effective cutting length, and such shifting of the hob is effected in the present instance by adjusting the hob spindle slide 27 back and forth along the guideway 26.

The means for shifting the spindle slide 27 along the ways 26 (see Fig. 5) may be of any suitable character. In the present instance, this means comprises an adjusting screw 53 which extends longitudinally between the ways 26. One end of the screw 53 is in threaded engagement with a nut 54 bolted or otherwise suitably fixed to the spindle slide 27. The other end of the screw 53, which may be called the shaft end, has a reduced shaft extension 55 which extends through and is rotatably journaled in a bearing sleeve 56. This sleeve is secured in fixed position, as by a pin 57, in a bore 58 opening through one end wall 59 of the swivel 24. The adjusting screw 53 is secured against endwise movement by means of lock nuts 60 on the outer end of the shaft extension 55 which serve to clamp the bearing sleeve 56 endwise against an annular shoulder 61. Preferably, the outer end of the shaft extension 55 is provided with a squared end 62 for the reception of a suitable hand tool.

The power drive for the adjusting screw 53 includes a gear 63 which is rotatable against the inner end of the bearing sleeve 56, and which is connected to the screw by means of a taper pin 64. The gear 63 meshes with a gear 65 rotatable by a pawl and ratchet mechanism 66.

The pawl and ratchet mechanism 66 (see Figs. 5 and 6) comprises a rockshaft 67 which extends at opposite ends respectively into two cylinders 68 and 69 and which is reciprocable therein. One of the cylinders 69 is closed by a head 70 screwed therein and formed with an axial bore 71 connected through radial bores 72 to an external peripheral groove 73. The cylinder is inserted into a bore 74 in the interior of the swivel 24 and is anchored in position by means of a pin 75, with the peripheral groove 73 in communication with a cored passage 76 constituting part of a line for supplying and exhausting pressure fluid. The other cylinder 68 is inserted through a bore 77 in the front wall 59 of the swivel 24 and projects a distance into a recess 78 so as to provide at the inner end a bearing support for the gear 65. The outer end of the cylinder 68 is formed with a peripheral flange which engages the end face or shoulder provided by a counterbore 79. The cylinder is secured in position by means of a threaded plug 80 in the outer end of the counterbore 79, and has a port 81 in the peripheral wall communicating with an annular groove 82 in the bore 77, this groove being connected to a cored passage 83 forming part of a fluid line for supplying and exhausting fluid under pressure. The associated end of the shaft 67 is formed with the reduced axial extension 84 adapted for engagement with the plug 80 to prevent closing of the port 81.

It will thus be seen that the opposite ends of the shaft 67 constitute pistons 85 and 86 which are both reciprocable and rotatable in the cylinders 68 and 69.

The intermediate portion of the shaft 67 is formed with longitudinal splines 87 and a peripheral flange 88 at one end of the splines. Inserted on the splines 87 in assembled relation against the flange 88 are two ratchet wheels 90 and 91 with oppositely facing teeth, and an intervening spacer sleeve 92. Also inserted on the splines 87 against the ratchet 91 is an elongated pinion 93, this pinion being secured in position by means of a set screw 94 to secure all of the parts on the shaft 67 in fixed assembled relation. The ratchets 90 and 91 are enclosed within an encircling annular pawl housing 95 which is rigidly connected, as by means of bolts 96, to the gear 65, and which with the gear is confined in a fixed axial position between the opposed end faces 97 and 98 of the recess 78.

Two clearance recesses 99 and 100 are formed in opposite ends of the pawl housing 95, and a fixed pin 101 extends therethrough and is secured in position by a set screw 102. Two oppositely acting pawls 103 and 104 are supported for free swinging movement on opposite ends of the pivot pin 101 within the recesses 99 and 100. These pawls extend in opposite directions for engagement respectively with the ratchet wheels 90 and 91, and are normally urged into such engagement by suitable leaf springs 105 and 106. The opposite ends of the spacer sleeve 92 are beveled as indicated at 107 and 108 to constitute cams adapted respectively for engagement with the pawls 103 and 104 to lift them out of engagement with the ratchets.

Figures 6, 7:
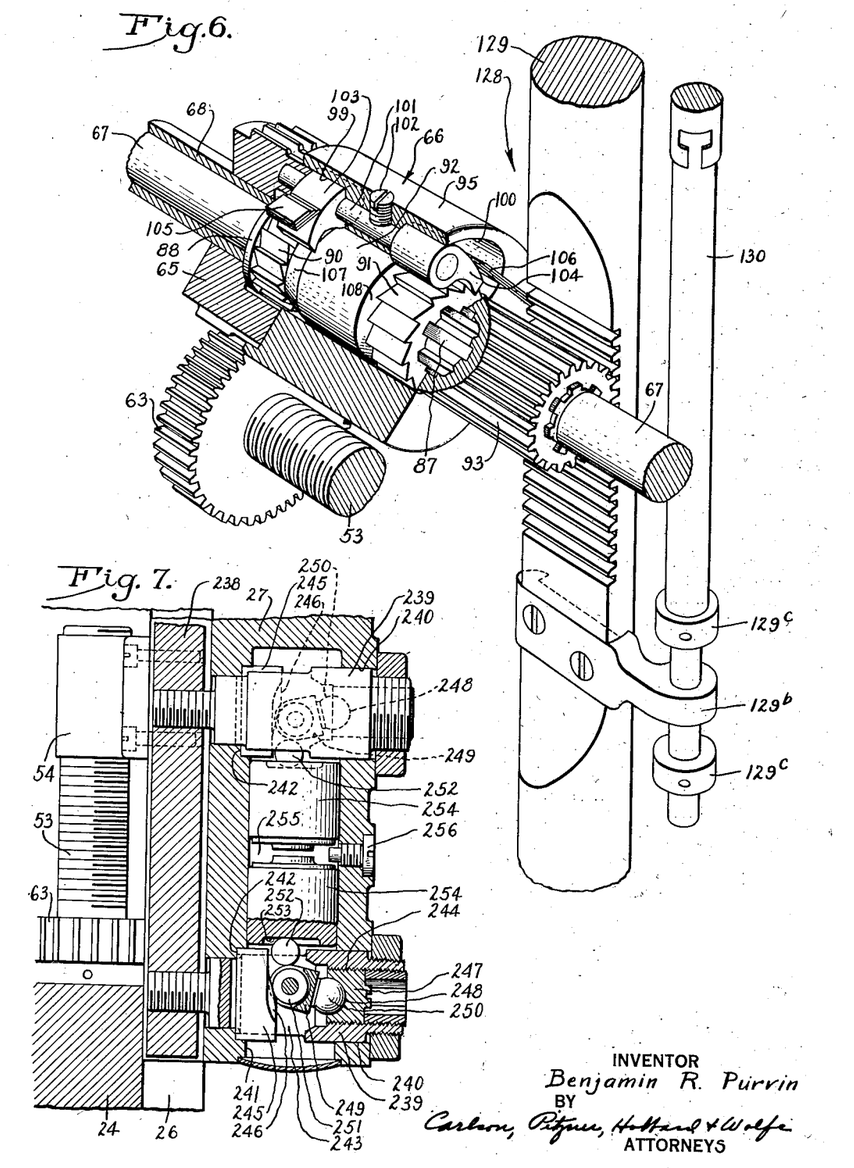
Fig. 6 is a fragmentary perspective view of a reversible pawl and ratchet driving mechanism for shifting the spindle slide incrementally in a direction axially of the hob.
Fig. 7 is a fragmentary sectional view taken along line 7—7 of Fig. 2 of a clamping mechanism for the hob spindle slide.
Figure 8:
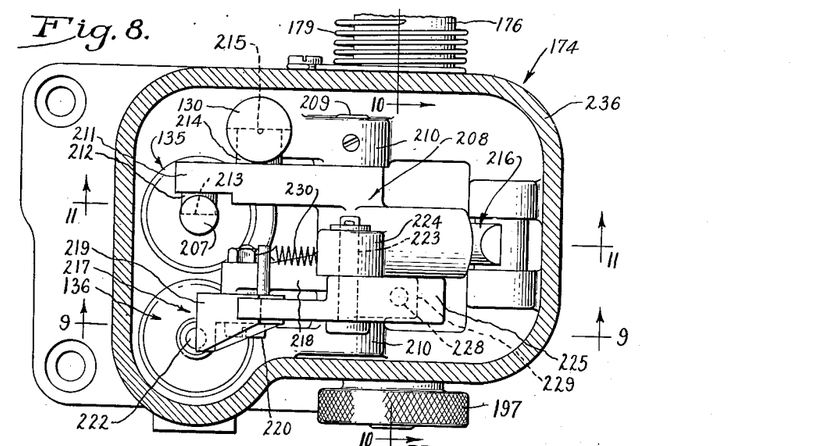
Fig. 8 is a horizontal sectional view taken along the line 8—8 of Fig. 5 of a counter mechanism for determining the aggregate extent of adjustment of the hob spindle slide in each machine cycle.
Figures 9, 10:
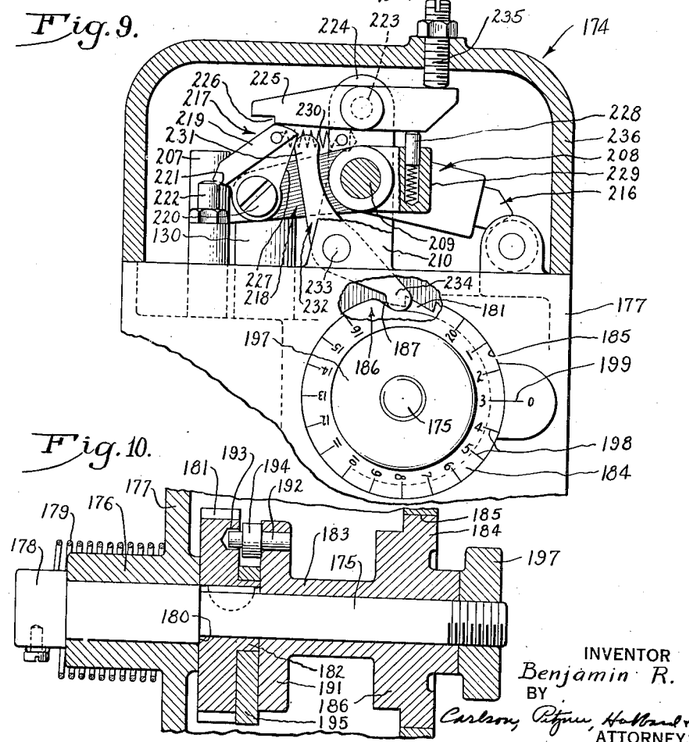
Fig. 9 is a fragmentary front elevational view of the counter mechanism, partially in section substantially along line 9—9 of Fig. 8.
Fig. 10 is a sectional detail view taken along line 10—10 of Fig. 8.

Upon movement of the shaft 67 into one end position, for example to the left in Fig. 6, the cam face 107 will engage the pawl 103 to disengage the latter from the ratchet wheel 90, and the cam face 108 will release the pawl 104 for engagement with the associated ratchet wheel 91, thereby conditioning the ratchet mechanism 66 to rotate the gear 65 in a clockwise direction. Upon movement of the shaft 67 into the other end position, the pawl 104 will be disabled and the pawl 103 will be released to engage the ratchet wheel 90 so as to condition the ratchet mechanism 66 to drive the gear 65 in the reverse direction. The ratchet mechanism 66 therefore constitutes means for reversing the direction of feed of the hob spindle slide 27.

Figure 5:
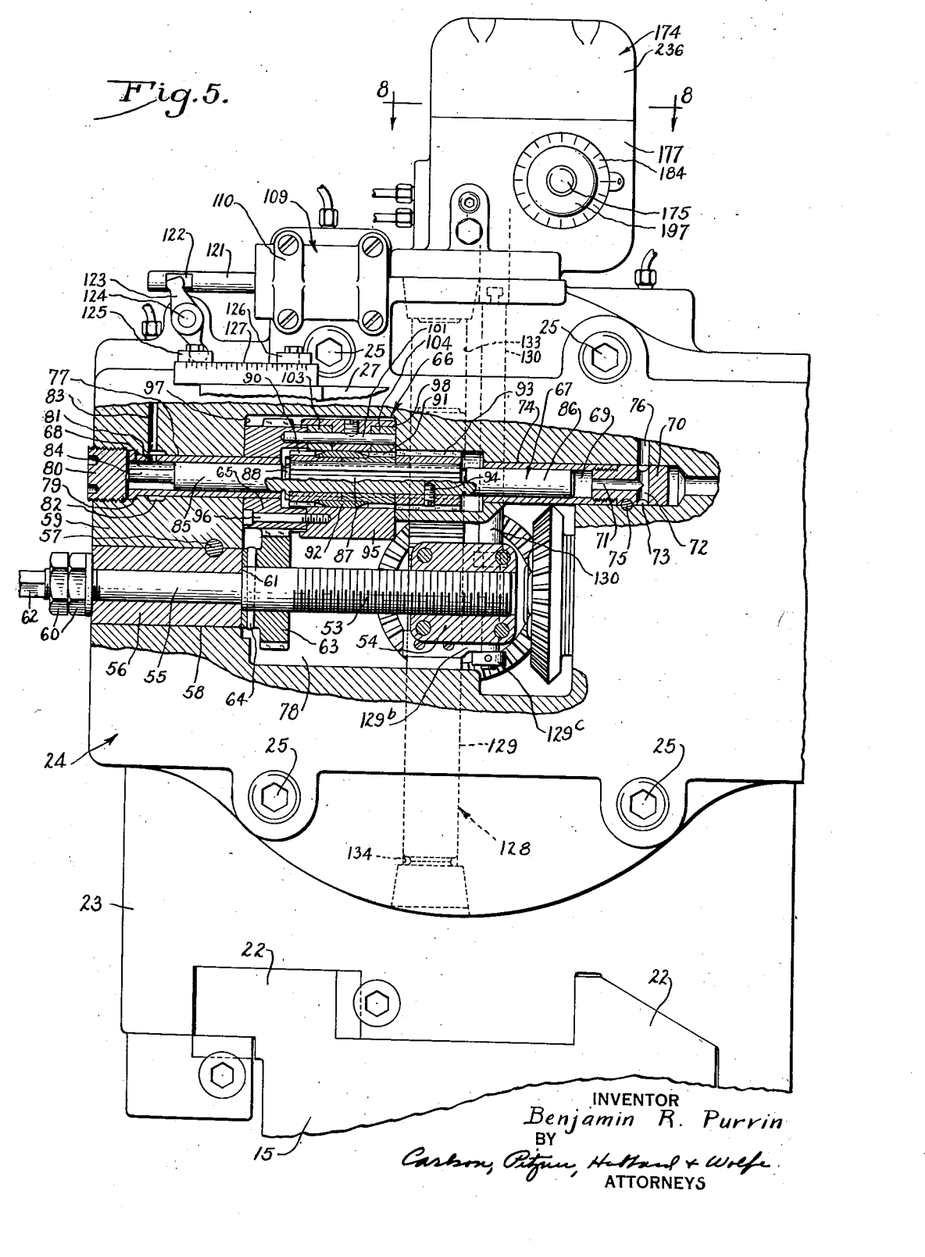
Fig. 5 is a fragmentary front elevational view, on an enlarged scale, and partially in section along line 5—5 of Fig. 2 of the hob slide assembly.
Figure 12:
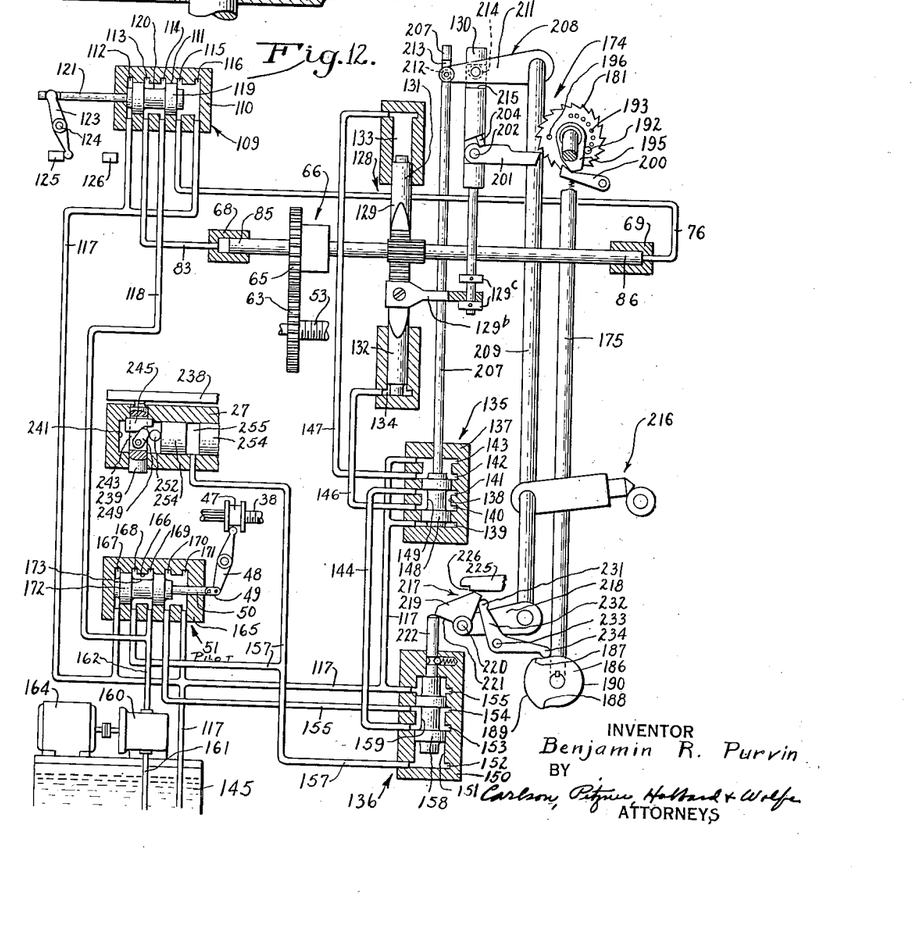
Fig. 12 is a diagrammatic representation of the hydraulic operating and controlling mechanism for the hob slide.

The reciprocation or position of the piston 75 shaft 67 is under the control of a direction valve 109 (see Figs. 5 and 12). This valve comprises a casing 110 mounted on the swivel 24, and having an axial bore 111 formed with a plurality of grooves 112, 113, 114, 115 and 116. The end grooves 112 and 116 are connected to a drain line 117, and the central groove 114 is connected to a pressure line 118. The grooves 113 and 115 intermediate the central groove on one hand and the end grooves on the other hand are connected respectively to the lines 83 and 76 opening to the pressure ends of the cylinders 68 and 69. A spool plunger 119 is mounted for reciprocatory adjustment in the bore 111, and has a central groove 120 adapted to be moved reversably into opposite end positions to connect the lines 76 and 83 reversably to the pressure and drain lines 118 and 117.

The valve plunger 119 has an actuating stem 121 which extends through one end of the valve casing 110, and the outer end of which is formed with a notch 122 adapted for engagement with the rounded end of an actuating lever 123. This lever is mounted as at 124 on the swivel 24, and the other end is disposed in the path of two spaced reversing dogs 125 and 126 mounted for adjustment along a suitable scale 127 on the hob spindle slide 27. It will be seen that upon movement of the slide 27 into either end position after a series of incremental feed movements through the desired range, one or the other of the dogs 125 and 126 will engage the lever 123 to reverse the direction valve 109, and thereby adjust the ratchet mechanism 66 to reverse the feed of the slide.

The shaft 67 is adapted to be oscillated by a hydraulic actuator 128 which consists of a rod or bar 129 formed with longitudinal rack teeth in meshing engagement with the elongated pinion 93. The opposite ends of the rack bar 129 are rounded, and constitute pistons 131 and 132 reciprocable respectively in opposed axially alined cylinders 133 and 134.

Reciprocation of the rack bar 129 is controlled by a direction valve 135 and a start and stop valve 136. The direction valve 135 comprises a valve casing 137 having a bore 138 formed with axially spaced internal grooves 139, 140, 141, 142 and 143. The central groove 141 is connected to an inlet line 144 for supplying fluid under pressure, and the end grooves 139 and 143 are connected to the drain line 117 discharging to a sump 145. The other two grooves 140 and 142 are connected through lines 146 and 147 respectively to the pressure ends of the cylinders 134 and 133. Reciprocable in the bore 138 is a valve plunger 148 of the spool type having an annular groove 149 adapted in opposite positions of adjustment to connect the lines 146 and 147 respectively and reversably to the inlet and drain lines 144 and 117.

The start and stop valve 136 comprises a valve casing 150 having an axial bore 151 formed with axially spaced annular grooves 152, 153, 154 and 155. The groove 155, adjacent one end of the bore 151, is connected to the drain line 117. The next groove 154 is connected to a line 156 adapted to supply fluid under pressure. The next groove 153 is connected to the line 144 leading to the direction valve 135. The other groove 152 adjacent the opposite end of the bore is connected to a control line 157 adapted to supply fluid under pressure. A valve plunger 158 of the piston type is reciprocable in the bore 151, and has an annular groove 159 adapted in one position to connect the lines 144 and 156 in the supply circuit for the rack bar cylinders 133 and 134, and in the other or stop position to block the inlet or supply line 156.

The hydraulic system comprises a pump 160 of suitable construction which has an inlet line 161 adapted to take a fluid pressure medium such as oil from the supply tank or sump 145, and which has a pressure discharge line 162 leading to the main control or pilot valve 51 operable by the swivel slide 23. The pump is driven by an electric motor 164.

The control valve 51 comprises a casing 165 having a central bore 166 formed internally with a plurality of axially spaced annular grooves 167, 168, 169, 170 and 171. The end grooves 167 and 171 are connected to the drain line 117. The central groove 169 is connected to the pressure line 162 from the pump 160. The other grooves 168 and 170 are connected to the control line 157 and the supply line 156 in the circuit for the hydraulic actuator 128. Reciprocable in the bore 166 is a valve plunger 172 of the spool type having an annular groove 173 which in opposite end positions serves to connect the lines 156 and 157 respectively and reversably to the pressure and drain lines 162 and 117. The plunger 172 is connected to the actuating stem 50.

It will thus be seen that upon movement of the swivel slide 23 into advanced position to present the hob H to the work W in the cutting cycle of the machine, the valve plunger 172 is located to connect the pump pressure line 162 with the control line 157, and the drain line 117 with the line 156, thereby disabling the hydraulic actuator 128 for the hob slide adjusting mechanism. Upon retraction of the swivel slide 23 into inoperative position, the valve 51 is shifted into its other end position of adjustment to connect the line 156 to pressure and the control line 157 to drain, thereby conditioning the system for operation of the hydraulic actuator 128 and the start and stop valve 136 for subsequent adjustment into stop position as hereinafter described.

The extent of axial shift of the hob spindle 28 in each machine cycle is subject to selective variation. This variation is obtained by controlling the number of times that the ratchet mechanism 66 is operated by the hydraulic actuator 128. More particularly, the hydraulic actuator 128 may be reciprocated but once, which would define a minimum adjustment, or a selected number of times, under the control of a stroke counting mechanism 174. If the actuator 128 is reciprocated more than once, the selected number of adjustments imparted to the spindle slide 27 are additive, and determine the full extent of hob adjustment.

The counting mechanism 174 is operable step-by-step in successive reciprocations of the actuator 128, and after a predetermined number of operations, subject to variation at the will of the operator from one to a maximum, is effective to shift the valve 136 into stop position.

Figure 11:
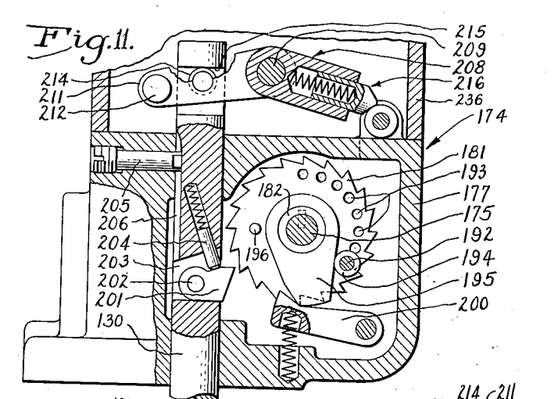
Fig. 11 is a fragmentary vertical sectional view taken substantially along line 11—11 of Fig. 8.

The counting mechanism 174 in the preferred form (see Figs. 8 to 12) comprises a cam shaft 175 journaled at one end in a bearing 176 within a suitable housing 177 mounted on the top of the swivel 24. A head 178 on the outer end of the shaft 175 engages the contiguous end of the bearing 176 to prevent axial movement of the shaft in one direction. A torsion spring 179 encircles the bearing 176 and is anchored at opposite ends respectively to the housing 177 and the collar 178. This spring tends to rotate the cam shaft in one direction, namely, in a counterclockwise direction as viewed in Fig. 11.

The inner end of the shaft 175 is reduced in diameter to provide a shoulder 180 substantially flush with the inner end of the bearing 176. A ratchet wheel 181 with an annularly projecting hub 182 on the inner face is keyed to the shaft 175 in position against the shoulder 180. Normally rotatable on the shaft 175 in position against the free end of the hub 182 is a sleeve 183. The outer end of the sleeve 183 is formed with a peripheral flange 184 which is supported for rotation in an opening 185 in the front wall of the housing 177, and the inner face of which immediately inside of the wall is formed with a rotary cam 186 having spaced oppositely facing cam surfaces 187 and 188. The high points of the cam surfaces are joined by an arcuate face 189 of relatively large radius, and the low points are joined by an arcuate face 190 of relatively small radius. The inner end of the sleeve 183 is integral with a disk 191 disposed against the end of the hub 182. A pin 192 is carried by the disk 191, and is adapted to be inserted selectively into any one of a series of annularly spaced recesses 193 in the adjacent side of the ratchet 181 so as to cause the ratchet and the cam 186 to be adjustable in angular phase relation but to be jointly rotatable. The intermediate portion of the pin 192 between the ratchet 181 and the disk 191 is enlarged to provide an abutment 194 and to retain the pin in position.

An arm 195 is suspended for free rotation on the hub 182 and is confined in axial position by the sleeve 183. This arm is disposed in the path of the abutment 194, and an angularly spaced fixed abutment 196 on the ratchet 181. A nut 197 threaded on the outer end of the shaft 175 into engagement with the sleeve 183 serves to maintain the various parts of the assembly just described in assembled relation. To permit adjustment of the cam 186 relatively to the ratchet 181, the nut 197 is removed, and the sleeve 183 is shifted on the shaft 175 to permit insertion of the pin 192 into another of the series of recesses 193. The front face of the flange 184 is provided with suitable graduations 198 coacting with a zero point 199 on the wall of the housing 177 to indicate the position of adjustment of the cam 186. The recesses 193 are angularly spaced to the same extent as the teeth of the ratchet 181.

A holding pawl 200 is pivoted on the inside of the housing 177, and is normally urged by spring pressure into engagement with the ratchet 181 to restrain the latter against rotation by the spring 179 in a counterclockwise direction. The ratchet 181 is adapted to be actuated by a pawl 201 pivoted, as at 202, in a slot 203 in a control rod 130 extending parallel to and reciprocable by the rod 129 through a lost motion connection at each end of the movement of the actuator 128. The connection comprises an arm 129b fixed to the rod 129 and arranged between and for alternate engagement with two collars 129c adjustably secured to the rod 130. Normally, the pawl 201 is urged into a fixed position against one side of the slot 203 by a spring-actuated plunger 204. A spline pin 205 extends through one wall of the housing 177 into a longitudinal groove 206 in the rod 130 to constrain the latter against rotation.

Upon upward movement of the rod 130, the pawl 201 will engage the ratchet 181 to rotate the latter in a clockwise direction through a distance of at least one tooth, but less than two teeth. In the reverse movement of the rod 130, the pawl 201 will permit return rotation of the ratchet 181 to the extent permitted by the locking pawl 200. The arm 195, when engaged by the abutment 194, is adapted to lift the locking pawl 200 out of engagement with the ratchet 181. If only a single actuation of the pawl and ratchet mechanism 66 is desired in each cycle, the counting mechanism 174 is set to count merely one reciprocation of the rod 130 before actuating the stop valve 136. For such setting, the pin 192 is inserted in the first recess 193 of the series so that the abutment 194 will engage the arm 195 and carry it into engagement with the locking pawl 200 during the first indexing step of the ratchet 181. As a result, the locking pawl 200 will not be in engagement with the ratchet 181 during the initial portion of the return movement of the rod 130, and hence the ratchet will be returned to initial position, and the abutment 196 will cause the arm 195 to release the pawl 200 again into engagement with the ratchet teeth. If a number of indexing steps are desired in each machine cycle before the cam 186 is operative to effect actuation of the stop valve 136, the pin 192 is inserted in some one of the succeeding recesses 193. The abutment 194 will render the arm 195 effective to lift the locking pawl 200 only during the last adjustment. Hence, the pawl 201 will coact with the ratchet 181 to cause step-by-step indexing of the latter according to the desired count until the abutment 194 finally engages the pawl 200, and then the ratchet will be returned to and stopped in initial position the same as in the setting for one count. The final movement of the cam 186, in one step or at the end of a selected series of steps, serves to move the cam surface 187 into a predetermined position to effect actuation of the stop valve 136, and the return movement of the ratchet 181 and the cam under the influence of the spring 179 serves to recondition the counting mechanism 174 for the next cycle of operations.

The direction valve 135 is automatically reversed at each end of the reciprocatory movement of the hydraulic actuator 128, so that the rod 130, carrying the ratchet pawl 201, will continue to reciprocate until the valve 136 is moved into stop position to interrupt the connection between the line 144 and the line 156. The means for actuating the valve comprises a valve stem 207 connected to the plunger 148, and extending axially from the casing 137. A composite lever 208 is rotatable on a bearing shaft 209 fixed at opposite ends in spaced lugs 210 on the housing 177, and one of its arms 211 provides a lost motion connection between the reciprocatory rod 130 and the stem 207. Thus, a pin 212 on the outer end of the lever arm 211 projects loosely into a transverse notch 213 in one side of the valve stem 207, and another pin 214 on an intermediate portion of the arm projects loosely into a transverse notch 215 in one side of the rod 130.

When the valve 135 is in one end position, as shown in Fig. 12, to supply pressure fluid to the cylinder 134, the rod 130 will be actuated in a working stroke to index the ratchet 181. At the end of the working stroke, one side of the notch 215 will engage the pin 214 to oscillate the lever 208. Thereupon, the pin 212, after taking up lost motion during which the lever 208 continues to oscillate, will engage one side of the notch 213 to shift the valve 135 into an intermediate position. An over-center load and fire mechanism 216 is then operable to complete the shifting of valve 135 into the other end position to reverse the hydraulic actuator. The rod 130 is now shifted in a return stroke. At the end of the return stroke, the rod 130 will again oscillate the lever 208 to shift the valve 135 into its initial position and thereby institute a repetition of the cycle.

The counting mechanism 174 is operatively associated with an actuating mechanism 217 for the start and stop valve 136. In each reciprocation of the rod 130, prior to the final reciprocation, the valve actuating mechanism 217 operates idly and ineffectively. The function of the counting mechanism 174 is to rotate the cam 186 into position, either after one or a selected series of feed movements of the hob slide 27, to condition the actuating mechanism 217 to shift the valve 136 into stop position after the final feed movement.

The valve actuating mechanism 217 (see Figs. 8 and 9) comprises an arm 218 on the lever 208. A connecting block 219 is pivoted at 220 to the free end of the arm 218 and preferably is triangular in shape. The block 219 has an abutment face 221 normally overlying and adapted to engage the projecting end of a valve stem 222 connected to the valve plunger 158 of the valve 136. Pivoted intermediate its ends at 223 on another arm 224 of the lever 208 is a detent lever 225. One end of the lever 225 is formed with a notch 226 adapted to engage an edge 227 on the heel of the block 219. A spring actuated plunger 228 in a lug 229 on the lever 208 engages the other end of the lever 225 to hold the latter yieldably against the block 219. When disengaged from the notch 226, the block 219 is retracted by a coiled tension spring 230, and is free to ride against the lever 225 without being constrained against oscillation.

The substantially radial surface of the heel of the block 219, at the side of the pivot 220 opposite the abutment surface 221, is in bearing engagement with the rounded end 231 of one arm of a cam follower lever 232 pivoted intermediate its ends at 233 on one of the lugs 210. The other arm of the lever 232 has a rounded end 234 in bearing engagement with the face of the rotary cam 186. When the valve actuating mechanism 217 is disabled, the spring 230 serves to maintain the block 219 against the lever 232, and the latter against the cam 186.

During each working stroke of the rod 130, the lever arm 218 is oscillated in a direction to lift the block 219 from the valve stem 222. If the feed movement being imparted to the hob slide 27 is not the last of the series, the lever 232 will cause the block 219 to oscillate or rock idly on the arm 218 without engaging in the notch 226. During the return stroke of the rod 130, the arm 218 will be oscillated in the reverse direction to move the block 219 toward the valve stem 222, but the latter will again oscillate without shifting the valve 136. However, during the last working stroke of the rod 130, as the arm 218 is lifted, the cam surface 187 will be advanced into final position to actuate the lever 232 and thereby oscillate the block 219 into position for engagement in the notch 226. This sets the valve actuating mechanism 217 so that the block 219 is held in fixed relation to the lever arm 218, and is movable positively therewith. As a result, during the final return stroke of the rod 130, the lever arm 218, acting through the block 219, will depress the valve 136 from the running position in which it is located by a spring detent into stop position to terminate the cycle of adjustment of the hob slide 27.

After setting the mechanism 217, the cam 186 has performed its function, and is returned to initial position, thereby releasing the lever 232 to permit disengagement of the block 219 from the notch 226. Near the end of the valve movement, an adjustable stop screw 235 will engage the heel end of the detent lever 225, and hold the latter against further oscillation. Further oscillation of the lever 208 then will disengage the notch 226 from the block 219, thereby again disabling the mechanism 217 for the next cycle of operations. The screw 235 is threaded through the wall of a cover 236 on the housing 177 enclosing the valve operating mechanisms.

Provision is made for automatically clamping the spindle or hob slide 27 in position of adjustment during the hobbing operation, or more particularly when the swivel slide 23 is shifted into the advanced position, and for automatically releasing the slide 27 to permit adjustment, between hobbing operations, as when the slide 23 is shifted into the retracted position. In the present instance, a hydraulic clamp (see Figs. 7 and 12) controlled by the valve 51 is provided for this purpose, and is operable to clamp the slide 27 to the guideway 26.

The hob slide 27 has dovetailed guides 237 and 238 mounted for adjustment in the guideway 26. One of the guides 238 is separate from the slide 27, and constitutes a clamping bar. A plurality of plungers 239 extend slidably through interfitting bores 240 in the slide 27, and at their inner ends are threaded into rigid engagement with the clamp bar 238. The bores 240 intersect a perpendicular bore 241 in the hob slide 27. The inner end of each of the bores 240 is reduced in diameter to provide a shoulder 242, and the plunger 239 is similarly reduced in size. Each plunger 239 is formed intermediate its ends with a diametrical slot 243 which opens to an axial threaded bore 244 in the outer end. A hardened clamp block 245, having a cam face 246, extends through the slot 243 and seats against the shoulder 242. The slot 243 is of sufficient length to provide clearance so as to permit clamping movement of the plunger 239 without unseating the block 245. Threaded into the outer end of the bore 244 is a plug 247 formed in its inner end with a semi-spherical socket 248. An actuating lever 249 within the slot 243 has a rounded ball end 250 seating in the socket 248, and carries a roller 251 on its free end for engagement with the cam block 245. The free end of the lever 249 is also in engagement with a roller 252 engaging a track 253 in the adjacent end of an actuating piston 254 reciprocable in the bore 241. Two such pistons are provided between two adjacent clamping devices, the bore 241 constituting a cylinder having a cored passage 255 connected to the control line 157 for admitting and discharging fluid under pressure. A pin 256 limits the release movement of the pistons 254.

In operation, upon outward movement, each piston 254 will press the associated roller 252 against the arm 249 and cause the roller 251 through engagement with the cam face 246 to force the clamping plunger 247 outwardly. As a result, the guide 238 is forced outwardly into wedging engagement with the adjacent side of the slide 27 and the inclined face of the dovetail guideway 26, thereby clamping the slide securely in position. Care must be taken in selecting the proper angle on the cam 246 so that the lever will not move past dead center, and will not wedge at such a small angle that disengagement is hampered.

Resumé of operation

The operating parts of the adjusting mechanism and the control elements therefor, as shown in Fig. 12, are in their normal or idle positions of adjustment. The ratchet reversing valve 109 is in position to connect the cylinders 68 and 69 respectively to the pressure and drain lines 118 and 117. Hence, the ratchet mechanism 66 is adjusted by the shaft 67 to condition the spindle slide 27 for movement in a forward direction. The adjustment of the remainder of the system is that which prevails during the intervals between successive cycles of the hob slide operation. The swivel slide 23 is in the advanced position which it occupies during each operating cycle of the machine.

The reversing valve 135 in its idle position connects the cylinder 133 directly to the drain line 117 and the cylinder 134 through the start and stop valve 136 and the control valve 51 also to the drain line. As a result, the rod 130 is disposed in its lowermost position to prepare the pawl 201 for engagement with the ratchet 181. The control valve 51 is in position to connect the clamping cylinder 241 and one end of the start and stop valve 136 through the control line 157 to the pressure line 162, so that the hob slide 27 is clamped in position, and the valve 136 is conditioned for starting operation.

Upon movement of the swivel slide 23 into retracted position at the end of the cutting operation, the control valve 51 is actuated to connect the clamping cylinder 241 and the pressure actuated end of the valve 136 to the drain line 117. As a result, the clamps for the hob slide are released, and the valve 136 is conditioned for movement into stop position. The control valve 51 also serves to complete a circuit from the pressure line 162, through the line 156, the valve 136, the line 144, the reversing valve 135, and the line 146 to the lower cylinder 134 of the feed actuator 128 which actuates the ratchet mechanism 66 to adjust the feed screw 38 through a predetermined distance. Near the end of its upward movement, the rack bar 129, through engagement of the arm 129$^b$ with the upper collar 129$^c$, actuates the control rod 130 to index the ratchet wheel 181 through a distance slightly greater than one but less than two teeth. The rod 130, through engagement of the pin 214, serves also to oscillate the lever 208 into its reverse position where it is maintained by the over-center device 216. Upon oscillation of the arm 211, the pin 212 engages the stem 207 to reverse the valve 135, thereby connecting the cylinder 133 to the source of pressure through the line 147, and the cylinder 134 to drain. This reverses the rack bar 129. Upon completion of the reverse movement, the rack bar, through engagement of the arm 129$^b$ with the lower collar 129$^c$, will return the control rod 130 into its original position, thereby effecting oscillation of the lever 208 to reverse again the direction valve 135.

The actuating rack bar 129 will be reciprocated continuously until the start and stop valve 136 is moved into stop position. This will occur after a selected number of reciprocations, depending on the number of feeding increments that it is desired to impart to the hob slide 27 after each machine cycle. The number or reciprocations is determined by the location of the pin 192 carried by the ratchet wheel 181. Assuming that only a single reciprocation is desired, the pin 192 is inserted in the first hole 193. In this event, upon actuation of the ratchet wheel 181 through the distance of one tooth, the abutment 194 will engage and carry with the ratchet the throw-out cam 195 to release the locking pawl 200. In the return movement of the actuating pawl 201, the torsion spring 179 will reverse the rotation of the ratchet wheel, and the fixed pin 196 will at the same time move the cam 195 out of engagement with the locking pawl 200 to permit the latter to drop into the same tooth space that it occupied at the start of the operation. The net result of the reciprocation of the rod 130 is to oscillate the ratchet wheel 181 and the cam 186 back and forth through approximately the distance of one tooth. In the advance rotation, the cam 186 will oscillate the lever 232 to set the valve actuating mechanism 217. In the return movement of the rod 130, the abutment member 219 will now depress the valve 136 into stop position, thereby blocking the communication between the lines 144 and 156 to stop further reciprocation of the rack bar 129. At the end of this movement, the heel of the latch 225 will engage the adjustable stop screw 235 so that continued oscillation of the lever 208 will effect a release of the abutment block 219. It will be seen that in the actuation of the control valve 51, the pressure end of the stop valve was connected to drain so that the stop valve will remain in this position.

If two feed increments are desired, the pin 192 is inserted in the second hole. This serves to adjust the cam 186 relative to the ratchet wheel 181 so as to prevent actuation of the lever 232 in the first oscillation. Consequently, the abutment block 219 merely swings on its pivot without depressing the stop valve 136. In the next cycle of operation, the conditions will be the same as above described for a single feed increment.

I claim as my invention:

1. In a hobbing machine, in combination, a support formed with rectilinear ways extending in one direction, a swivel slide mounted on said ways for reciprocation alternately into an advanced operative position and a retracted inoperative position, a swivel mounted on the forward end of said slide for rotary adjustment about an axis parallel to said ways and being formed with diametrical ways perpendicular to said first mentioned ways, a hob slide mounted on said diametrical ways for adjustment, clamping means for securing said hob slide in position of adjustment to said ways, a hob spindle journaled on said hob slide and extending parallel to said diametrical ways, means for rotating said spindle, drive means including a reversible pawl and ratchet mechanism for adjusting said hob slide along said diametrical ways, and control means responsive to movement of said swivel slide into said retracted position for effecting operation of said drive means a selected number of times to shift said hob slide through a corresponding number of adjustments.

2. In a hobbing machine, in combination, a support formed with ways extending in one direction, a swivel slide mounted on said ways for reciprocation alternately into an advanced operative position and a retracted inoperative position, a swivel mounted on the forward end of said slide for rotary adjustment about an axis parallel to said ways and being formed with diametrical ways perpendicular to said first mentioned ways, a hob slide mounted on said diametrical ways for adjustment, a hob spindle journaled on said hob slide and extending parallel to said diametrical ways, means for rotating said spindle, drive means for adjusting said hob slide along said diametrical ways, and control means responsive to movement of said swivel slide into said retracted position for effecting operation of said drive means to adjust said hob slide through a predetermined distance.

3. In a hobbing machine, in combination, a support formed with ways extending in one direction, a base slide mounted on said ways for reciprocation alternately into an advanced operative position and a retracted inoperative position, a hob slide slidably mounted for rectilinear adjustment on said base slide, a hob spindle journaled on said hob slide, drive means for adjusting said hob slide longitudinally of said spindle, and control means responsive to movement of said base slide into said inoperative position for effecting operation of said drive means to adjust said hob slide through a predetermined distance.

4. In a machine tool, in combination, a support, a base slide mounted on said support for reciprocation alternately into an advanced operative position and a retracted inoperative position, a tool slide mounted on said base slide for transverse adjustment, clamping means for securing said tool slide in position of adjustment, a tool spindle journaled on said tool slide, drive means for adjusting said tool slide, and control means automatically operable upon each movement of said base slide into said inoperative position to release said clamping means and to effect a series of intermittent operations of said drive means to adjust said tool slide step-by-step through a predetermined aggregate distance, said control means being operable upon each movement of said base slide into said advanced position to apply said clamping means.

5. In a machine tool, in combination, a support, a base slide mounted on said support for reciprocation alternately into an advanced operative position and a retracted inoperative position, a spindle slide mounted on said base slide for transverse adjustment, a spindle journaled on said spindle slide, drive means including a reversible intermittent motion device for adjusting said spindle slide through a predetermined range, and control means responsive to each movement of said base slide into said inoperative position for effecting operation of said drive means a selected number of times to shift said spindle slide a corresponding number of steps, said control means being automatically operable at each end of said range to reverse said intermittent motion device.

6. In a machine tool, in combination, a support, a base slide mounted on said support for reciprocation alternately into an advanced operative position and a retracted inoperative position, a spindle slide mounted on said base slide for transverse adjustment, a spindle journaled on said spindle slide, drive means intermittently operable to shift said slide step-by-step through a predetermined range, and to reverse said slide at each end of said range, a hydraulic actuator for said drive means, a counter operable by said actuator, and control means for instituting operation of said actuator upon movement of said base slide into retracted position and operable by said counter after a selected number of movements of said actuator to disable said actuator.

7. An automatic slide comprising, in combination, a support, a spindle mounted on said support for rotary drive and for axial movement through a predetermined range, said spindle being adapted to support a tool for rotation and axial movement therewith, and means operable through an automatic cycle to shift said spindle axially in successive cycles through a series of adjustments within said range, said means comprising intermittent drive means recurrently operable in each cycle to effect each adjusting movement in a selected number of additive steps each of fixed distance, and control means automatically operable in each cycle upon completion of said selected number of steps to interrupt said drive means.

8. An automatic slide comprising, in combination, a support, a spindle mounted on said support for rotary drive and for axial movement through a predetermined range, said spindle being adapted to support a tool for rotation and axial movement therewith, and means periodically operable through an automatic cycle to shift said spindle axially in successive cycles through a series of adjustments within said range, said means comprising intermittent reversible drive means recurrently operable in each cycle to effect each adjusting movement in a selected number of additive steps each of fixed distance, means for automatically reversing said drive means at each end of said range, and control means automatically operable in each cycle upon completion of said selected number of steps to interrupt said drive means.

9. An automatic slide comprising, in combination, a support, a spindle mounted on said support for rotary drive and for axial movement through a predetermined range, said spindle being adapted to support a tool for rotation and axial movement therewith, and means periodically operable through an automatic cycle to shift said spindle axially in successive cycles through a series of adjustments within said range, said means comprising reversible drive means, means for automatically reversing said drive means at each end of said range, and control means automatically operable in each cycle to interrupt said drive means at the end of each adjustment.

10. An automatic slide comprising, in combination, a support, a spindle mounted on said support for rotary drive and for axial movement through a predetermined range, said spindle being adapted to support a tool for rotation and axial movement therewith, and means periodically operable through an automatic cycle to shift said spindle axially in successive cycles through a series of adjustments within said range, said means comprising drive means operable in each cycle to shift said spindle through one adjustment, clamp means for securing said spindle in position of adjustment, and control means automatically operable in each cycle to interrupt said drive means at the end of each adjustment, and to release said clamp means for each adjustment and apply said clamp means after each adjustment.

11. An automatic slide comprising, in combination, a support, a spindle mounted on said support for rotary drive and for axial movement through a predetermined range, said spindle being adapted to support a tool for rotation and axial movement therewith, and means periodically operable through an automatic cycle to shift said spindle axially in successive cycles through a series of adjustments of predetermined length within said range, said means comprising intermittent drive means recurrently operable in each cycle to shift said spindle in increments through one adjustment, and control means automatically operable in each cycle to interrupt said drive means at the end of each adjustment, said control means being selectively adjustable to vary the length of said spindle adjustments.

12. An automatic slide comprising, in combination, a support, a spindle mounted on said support for rotary drive and for axial movement through a predetermined range, said spindle being adapted to support a tool for rotation and axial movement therewith, and means periodically operable through an automatic cycle to shift said spindle axially in successive cycles through a series of adjustments within said range, said means comprising intermittent reversible drive means recurrently operable in each cycle to effect each adjusting movement in a selected number of additive steps each of fixed distance, control means selectively adjustable to vary said number of steps from one to maximum, and being automatically operable upon completion of said selected number of steps to interrupt said cycle, and means automatically operable upon shifting movement of said spindle into either end positions of said range to reverse said drive means and thereby the direction of said adjusting movements.

13. An automatic slide comprising, in combination, a support, a slide on said support, a spindle mounted on said slide for rotary drive and for axial movement with said slide through a predetermined range, said spindle being adapted to support a tool for rotation and axial movement therewith, a nut and screw drive for said slide, a reversible pawl and ratchet mechanism periodically operable through an automatic cycle to rotate said drive in successive cycles through a series of adjustments within said range, a hydraulic actuator for recurrently operating said pawl and ratchet mechanism, control means automatically operable in each cycle upon completion of a predetermined number of operations of said pawl and ratchet mechanism to disable said actuator, and means automatically operable upon shifting movement of said slide into either end position of said range to reverse said drive means and thereby the direction of said adjustments.

14. An automatic slide comprising, in combination, a support, a slide on said support, a spindle mounted on said slide for rotary drive and for axial movement with said slide through a predetermined range, said spindle being adapted to support a tool for rotation and axial movement therewith, and means periodically operable through an automatic cycle to shift said slide in successive cycles through a series of adjustments within said range, said means comprising intermittent drive means recurrently operable in each cycle to effect each adjustment in a selected number of additive steps each of fixed distance, and control means selectively adjustable to vary said number of steps from one to maximum, and being automatically operable upon completion of said selected number of steps to interrupt said cycle.

15. In an automatic slide, in combination, a support, a slide shiftable on said support, a nut and screw drive for shifting said slide and having a rotary drive element, and a double pawl and ratchet mechanism for rotating said element, said ratchet mechanism comprising a longitudinally shiftable rotary shaft, two spaced ratchet wheels splined to said shaft and having teeth disposed respectively in opposite directions, a housing rotatable about said wheels and geared to said element, two oppositely acting pawls pivoted in said housing and adapted for engagement respectively with said ratchet wheels, a double end cam member fixed on said shaft between said ratchet wheels and shiftable in opposite directions respectively to disable one or the other of said pawls, means for shifting said shaft axially, and means for oscillating said shaft.

16. In an automatic slide, in combination, a support, a slide carrying a rotary spindle and being shiftable on said support axially of said spindle, intermittent drive means for shifting said slide step-by-step, and control means operable by said drive means and acting to stop said drive means after said slide has been shifted through a predetermined number of steps.

17. In an automatic slide, in combination, a support, a slide carrying a rotary spindle and being shiftable on said support axially of said spindle, intermittent drive means for shifting said slide step-by-step, and control means including a counter operable by said drive means and acting to stop said drive means after said slide has been shifted through a predetermined number of steps, said counter being adjustable to vary said number of steps from one to maximum.

18. In an automatic hob slide, in combination, a support, a slide carrying a rotary spindle and being shiftable on said support axially of said spindle, a reversible pawl and ratchet mechanism for shifting said slide step-by-step through a predetermined range, hydraulic means for automatically reversing said mechanism at each end of said range, a reciprocatory hydraulic actuator for said mechanism, means operable by said actuator for reversing said actuator at each end of its reciprocation, a start and stop valve for controlling the operation of said actuator, a valve operating mechanism for said valve and being normally ineffective, and a counter operable by said actuator to condition said valve operating mechanism to shift said valve into stop position after a predetermined number of reciprocations of said actuator.

19. In a machine tool, in combination, a cutting tool support and a work support mounted for a repetitious cycle of relative movements, said tool support having a rotary tool spindle journalled therein and mounted for axial adjustment, drive means including a reversible intermittent motion device for adjusting said spindle through a predetermined range, and control means responsive to relative movement of said tool and work supports in each cycle for effecting operation of said drive means a selected number of times to shift said spindle axially a corresponding number of steps, said control means being automatically operable to each end of said range to reverse said intermittent motion device.

20. In a hobbing machine having rotary work and hob supporting spindles mounted for movement relative to each other to effect a hobbing operation, the combination of, a support, a slide supporting said hob spindle and mounted on said support for adjustment relative thereto to shift said hob spindle axially, a hydraulic cylinder and a piston movable therein, means actuated by movement of said piston in one direction to shift said slide one step, a clamp for locking said slide in said support, a hydraulic actuator adapted when energized and deenergized to respectively apply and release said clamp, mechanism by which said spindles may be moved relative to each other to effect hobbing of a workpiece on said work spindle by a hob on the hob spindle, valve means actuated in response to relative movement between said spindles after hobbing of the workpiece to admit pressure fluid to said cylinder for advancing said piston in a direction to shift said hob spindle and also to release fluid from said actuator whereby to disable said clamp, and valve means responsive to another relative motion between said spindles after completion of the shifting of said hob to reenergize said actuator and apply said clamp.

21. In a hobbing machine having rotary work and hob supporting spindles mounted for movement relative to each other to effect a hobbing operation, the combination of, a support, a slide supporting said hob spindle and mounted in said support for adjustment relative thereto to shift said hob spindle axially, a power actuator adapted when energized to shift said slide through a predetermined increment, a clamp for locking said slide in said support, a hydraulic actuator adapted when energized and deenergized to respectively apply and release said clamp, mechanism operable in a cycle of relative movements between said spindles to effect hobbing of a workpiece on said work spindle by a hob on the hob spindle, means actuated in response to relative movement between said spindles in said cycle after hobbing of the workpiece to energize said first actuator to shift said hob spindle and to release pressure fluid from said hydraulic actuator whereby to disable said clamp, and valve means responsive to another relative motion between said spindles after completion of the shifting of said hob to reenergize said second actuator and apply said clamp.

22. In a hobbing machine having rotary work and hob supporting spindles mounted for movement relative to each other to effect a hobbing operation, the combination of, a support, a slide supporting said hob spindle and mounted in said support for adjustment relative thereto to shift said hob spindle axially, a power actuator operable when energized to shift said slide one step, a clamp for locking said slide in said support, a hydraulic actuator adapted when energized and deenergized to respectively apply and release said clamp, mechanism operable in a cycle of relative movements between said spindles to effect hobbing of a workpiece on said work spindle by a hob on the hob spindle, means actuated in response to relative movement between said spindles in said cycle after hobbing of the workpiece to energize said first actuator to shift said hob spindle axially, and valve means also actuated in response to said last-mentioned relative movement to release fluid from said hydraulic actuator whereby to disable said clamp.

23. In a hobbing machine having rotary work and hob supporting spindles mounted for movement relative to each other to effect a hobbing operation, the combination of, a support, a slide supporting said hob spindle and mounted in said support for adjustment relative thereto to shift said hob spindle axially, a power actuator operable when energized to shift said slide one step, a clamp for locking said slide in said support, a second power actuator adapted when energized and deenergized to respectively apply and release said clamp, mechanism operable in a cycle of relative movements between said spindles to effect hobbing of a workpiece on said work spindle by a hob on the hob spindle, and means actuated in response to relative movement between said spindles in said cycle after hobbing of the workpiece to energize said first actuator to shift said hob spindle axially and also deenergize said second actuator to release said clamp.

24. In a hobbing machine, the combination of, a frame, a rotary work spindle, a rotary hob spindle, a member supporting said hob spindle for axial step-by-step adjustment, a power actuator adapted when energized to advance said member and adjust said hob spindle axially through one of said steps, a slide mounted on said frame for rectilinear feeding movement along a predetermined path, a second slide supporting said adjustable member and mounted on said frame for rectilinear movement along a path extending transversely of said feeding path, mechanism by which said slides may be moved in a cycle during which the work and hob are first fed past each other along said first path and then moved apart by movement of said second slide along said second path whereby to separate the work and hob, and mechanism operated by said last-mentioned separating movement to energize said actuator and thereby adjust said hob spindle axially.

BENJAMIN R. PURVIN.

REFERENCES CITED

The following references are of record in the file of this patent:

UNITED STATES PATENTS

| Number | Name | Date |
|---|---|---|
| 1,981,224 | De Vlieg | Nov. 20, 1934 |
| 2,210,134 | Staples | Aug. 6, 1940 |
| 2,355,677 | Ransome | Aug. 15, 1944 |
| 2,364,932 | Warner et al. | Dec. 12, 1944 |